(12) United States Patent
Tasselli et al.

(10) Patent No.: US 9,723,183 B2
(45) Date of Patent: Aug. 1, 2017

(54) ENCLOSURE AND ARRANGEMENT FOR RECESS MOUNTING OF A CAMERA OR CAMERA HEAD

(71) Applicant: Axis AB, Lund (SE)

(72) Inventors: Corrado Tasselli, Malmö (SE); Anna Papée, Lund (SE); David Fagerkvist, Bunkeflostrand (SE)

(73) Assignee: Axis AB, Lund (SE)

( * ) Notice: Subject to any disclaimer, the term of this patent is extended or adjusted under 35 U.S.C. 154(b) by 31 days.

(21) Appl. No.: 14/971,589

(22) Filed: Dec. 16, 2015

(65) Prior Publication Data
US 2016/0182773 A1 Jun. 23, 2016

(30) Foreign Application Priority Data
Dec. 18, 2014 (EP) .................................... 14198945

(51) Int. Cl.
*H04N 5/225* (2006.01)
*G08B 13/196* (2006.01)
(Continued)

(52) U.S. Cl.
CPC ....... *H04N 5/2252* (2013.01); *G08B 13/1963* (2013.01); *G08B 13/19619* (2013.01);
(Continued)

(58) Field of Classification Search
CPC .. H04N 5/2252; H04N 5/2256; H04N 5/2251; G08B 13/19619; G08B 13/1963;
(Continued)

(56) References Cited

U.S. PATENT DOCUMENTS 4,289,390 A * 9/1981 Lermann ................ G03B 17/04
396/347
5,818,519 A 10/1998 Wren
(Continued)

FOREIGN PATENT DOCUMENTS

CN 1294312 A 5/2001
CN 103890652 A 6/2014
(Continued)

OTHER PUBLICATIONS

EP 14 19 8495.9 European Search Report (Jun. 2, 2015).
(Continued)

*Primary Examiner* — Roberto Velez
*Assistant Examiner* — Tuan Le
(74) *Attorney, Agent, or Firm* — Volpe and Koenig, P.C.

(57) ABSTRACT

The present invention relates to an enclosure for recess mounting of a camera or camera head in a recess of a surface, the enclosure comprising an attachment portion, a cable sealing portion being adapted to seal against an outer surface of the cable extending through the cable sealing portion, and a circumferential wall portion adapted to extend along a closed path in a circumferential direction and in a first direction extending from the attachment portion towards the cable sealing portion, wherein at least a portion of the circumferential wall portion is formed of a flexible and/or elastic material such that the cable sealing portion is movable relative the attachment portion. The present invention also relates to an arrangement for recess mounting of a camera or camera head in a recess of a surface.

15 Claims, 4 Drawing Sheets

(51) Int. Cl.
*H02G 3/12* (2006.01)
*H02G 3/08* (2006.01)

(52) U.S. Cl.
CPC ............. *H02G 3/086* (2013.01); *H02G 3/123* (2013.01); *H04N 5/2251* (2013.01); *H04N 5/2256* (2013.01); *G08B 13/19632* (2013.01); *H02G 3/083* (2013.01)

(58) Field of Classification Search
CPC .. G08B 13/19632; H02G 3/123; H02G 3/086; H02G 3/083; H02G 3/20; F21V 21/04; Y10T 29/49124; H04R 2201/021
See application file for complete search history.

(56) References Cited

U.S. PATENT DOCUMENTS

| | | | | |
|---|---|---|---|---|
| 6,061,087 | A | * | 5/2000 | Schieltz ................. G03B 17/55 348/151 |
| 6,353,185 | B1 | | 3/2002 | Sakata |
| 6,354,749 | B1 | * | 3/2002 | Pfaffenberger, II .... G03B 17/00 348/143 |
| 6,621,005 | B1 | * | 9/2003 | Lovec ................. A61B 1/00114 174/74 R |
| 6,678,001 | B1 | * | 1/2004 | Elberbaum ...... G08B 13/19619 348/373 |
| 7,495,703 | B2 | | 2/2009 | Arbuckle |
| 2004/0263623 | A1 | * | 12/2004 | Arbuckle ......... G08B 13/19619 348/143 |
| 2007/0126872 | A1 | * | 6/2007 | Bolotine .......... G08B 13/19619 348/151 |
| 2007/0242134 | A1 | * | 10/2007 | Zernov ................. H04N 5/2252 348/81 |
| 2011/0096164 | A1 | * | 4/2011 | Mori ...................... G02B 7/003 348/143 |
| 2011/0199482 | A1 | * | 8/2011 | Morgan ............... H04N 5/2251 348/143 |
| 2013/0258102 | A1 | | 10/2013 | Chen |
| 2013/0319752 | A1 | | 12/2013 | Cowles et al. |

FOREIGN PATENT DOCUMENTS

| | | |
|---|---|---|
| DE | 10 2005 016340 B3 | 8/2006 |
| EP | 0 544 996 A2 | 6/1993 |
| EP | 1 096 452 A2 | 5/2001 |
| JP | 2001-238101 A2 | 8/2001 |
| JP | 2003-174571 A2 | 6/2003 |
| JP | 2008-016996 A2 | 1/2008 |
| JP | 2008-141232 A2 | 6/2008 |
| JP | 2011-017839 A2 | 1/2011 |
| JP | 2013-034082 A2 | 2/2013 |
| WO | 2006012524 A2 | 2/2006 |
| WO | 2012148719 A2 | 11/2012 |

OTHER PUBLICATIONS

"Sealing Gaiter for Single Cables"; Internet search, Nov. 14, 2014.
"PTZ Dome Camera CCTV PTZ PTZ-92E021"; Internet search, Nov. 14, 2014.

* cited by examiner

ENCLOSURE AND ARRANGEMENT FOR RECESS MOUNTING OF A CAMERA OR CAMERA HEAD

FIELD OF INVENTION

The invention relates to an enclosure for recess mounting of a camera or camera head in a recess of a surface. The invention also relates to an arrangement for recess mounting of a camera or camera head in a recess of a surface.

BACKGROUND

It is known to provide arrangements for recess mounting cameras. This is, e.g., typically the case when surveillance cameras are mounted inside an office space or the like, where there also are provided recesses in the suspended ceiling for spotlights and other equipments. The arrangements often comprise a cover or dome shaped window located on the visible side of the suspended ceiling whereas a significant part of the arrangement is located on the backside of the tiles of the suspended ceiling. If the camera mount is to be given specific IP-classifications regarding protection against, e.g., dust and water there is often a need to provide some kind of enclosure encapsulating the camera. Currently IP-rated mounts for surveillance cameras are rigid cups in which the camera is mounted. The sealing between the cable and the enclosure is normally done by using a cable gland or the like. Often there is a desire to be able to orient the cameras in a desired direction, e.g., by a certain pan, tilt or rotational orientation at least in association with the installation of the camera. The cable extends from the camera in a specific direction based on the design of the connection between the camera and cable. The cable extending from the camera is from a user's perspective perceived as relatively stiff. The latter is especially true for cases in which the camera is divided into a camera head including optics and an image sensor and a main unit including an image processor, with a cable extending from the camera head to the main unit. Furthermore, this is especially the case if such a camera is to be classified according to a specific IP classification which requires also the cable to withstand the requirements associated with the IP classification. Such a cable is often perceived by the installer as being stiff.

To allow the user to install the camera and be able to orient the camera in the desired direction it is often necessary to provide an extra length of the cable inside the enclosure such that the camera or camera head may be tilted, panned or rotated without the stiff cable preventing easy handling of the camera or camera head. To be able to accommodate the extra length of the cable the arrangement becomes undesirably bulky and space-requiring.

SUMMARY

It is an object of the invention to provide a solution which allows for easy handling and orientation of a recess mounted camera or camera head and which solution is space-efficient.

This object has been achieved by an enclosure for recess mounting of a camera or camera head in a recess of a surface, the enclosure comprising; an attachment portion, which when in use is adapted to be fixed relative to said recess; a cable sealing portion having an opening allowing a cable attached or adapted to be attached to said camera or camera head to extend through the opening and out of the enclosure, the cable sealing portion being adapted to seal against an outer surface of the cable extending through the cable sealing portion; and a circumferential wall portion adapted to extend along a closed path in a circumferential direction and in a first direction extending from the attachment portion towards the cable sealing portion, which first direction in use of the enclosure is adapted to extend into the recess; wherein the enclosure is adapted to in use provide a cavity inside which a camera or camera head located in the recess is positioned; and wherein at least a portion of the circumferential wall portion is formed of a flexible and/or elastic material such that the cable sealing portion is movable relative the attachment portion.

The enclosure is provided with an attachment portion, which (when the enclosure is in use, i.e. mounted in an arrangement) is adapted to be fixed relative to the recess. Thereby the enclosure as such is held in its correct location. The attachment portion may be a continuous annular, circular or non-circular, portion adapted to extend around the recess thereby adapted to directly or indirectly form a sealing separating the environment on one side of the surface from the environment of the other side of the surface. The attachment portion may alternatively be formed of a plurality of segments distributed around the circumference of the enclosure.

The enclosure is further provided with a cable sealing portion having an opening adapted to allow a cable to extend from the camera or camera head out of the enclosure. The cable may be fixedly attached to the camera or camera head or may be attachable/detachable using any suitable connector. The cable sealing portion is adapted to seal against an outer envelope surface of the cable.

The enclosure is further provided with a circumferential wall portion adapted to extend along a closed path in a circumferential direction and in a first direction extending from the attachment portion towards the cable sealing portion, which first direction in use of the enclosure is adapted to extend into the recess. It may be noted that the wall extends along a closed path in the circumferential direction. The wall itself need not form a closed loop. However, it is preferred that the wall forms a closed loop. It may be noted that the closed loop need not be circular. However, it is preferred that the closed loop is circular.

The enclosure is adapted to in use provide a cavity inside which a camera or camera head located in the recess is positioned. The cavity may be said to be cup shaped or have a frusto-conical shape. This way the enclosure will essentially form a cup or cone extending into the recess and thereby enclose, and preferably entirely enclose, those parts of the camera or camera head which are positioned inside the recess. In short it may be said that the enclosure will basically look like a cup with the cable sealing portion located at the bottom of the cup, with the circumferential wall portion forming the wall of the cup, and with the attachment portion corresponding to the rim of the cup.

Furthermore, at least a portion of the circumferential wall portion is formed of a flexible and/or elastic material such that the cable sealing portion is movable relative to the attachment portion. By securing that the cable sealing portion is movable relative to the attachment portion in this manner it becomes easy to tilt or pan the camera or camera head. As the camera or camera head is moved, any change of the inherent or natural position of the cable will be accommodated by the flexibility of the flexible portion of the enclosure. Since the enclosure in itself is flexible there is no need for the provision of any complex joints or the like to accommodate the movement of the cable. Nor is there any need for any extra length of cable within the enclosure since the cable is allowed to move freely due to the fact that the cable sealing portion is movable in relation to the attachment portion. Without any need for complex joints or extra cable length it is possible to design the enclosure as a compact solution. The overall size of the enclosure thus basically only needs be of a size accommodating the camera or camera head and any camera support therein. Said at least a portion of the circumferential wall portion formed of a flexible and/or elastic material may be formed of an elastomeric material having hardness between 20 and 60° Shore A.

The cable sealing portion may be formed of a material which is flexible and/or elastic. Thereby the inherent material properties of the sealing portion may be used to form a seal between the cable and the cable sealing portion when the cable is threaded through the cable sealing portion.

The cable sealing portion may in a released state have an inner circumference being smaller than a circumference of the cable adapted to extend out of the enclosure. Thereby the geometry and material properties may be used to form a seal between the cable and the cable sealing portion.

The cable sealing portion may be formed of an elastomeric material having hardness between 20 and 60° Shore A. Such a material will allow great deflections and an ability to return to its original shape. The material has an inherent strength which makes it possible to design the enclosure with a material thickness of about 1-2 mm, whereby the cavity will be easily deformed by the user installing or adjusting the camera.

It may be noted that it may be possible to use stiffer or harder materials if the geometry of the enclosure is flexible in itself. Such a flexible geometry may, e.g., be designed as a bellows with great flexibility. With a less flexible geometry, such as a cone with straight walls, it may be needed to use a softer or more flexible material. A softer material may also be used, for instance if there is no need for the enclosure to retain a certain shape unsupported. It may be noted that the material need not be elastomeric, any other flexible or elastic materials could be used.

The cable sealing portion may be movable relative to the attachment portion in the first direction and along a plane parallel to a plane defined by a mouth of said recess. This way the cable sealing portion is movable such that it may accommodate the movement of the cable as the camera or camera head is oriented during installation or subsequent adjustment.

It is preferred that the cable sealing portion be movable relative to the attachment portion in the first direction and simultaneously along a plane parallel to a plane defined by a mouth of said recess. By designing the enclosure of a flexible (and preferably also elastic) material, such simultaneous movement is provided for.

Said at least a portion of the circumferential wall portion being formed of a flexible and/or elastic material may comprise a bellows portion shaped as a bellows tapered along a first direction extending from the attachment portion towards the cable sealing portion. This way the geometry of the enclosure provides flexibility. Further, a comparably high flexibility is achievable in relation to the inherent flexibility of the material chosen.

The bellows portion may comprise a plurality of annular undulations each comprising a first major portion extending in said first direction and a second major portion extending in a second direction opposite said first direction, wherein the undulations are non-overlapping such that the bellows portion may be collapsed in said second direction. This way a great flexibility is achieved. Moreover, it is possible to transport the enclosure in a space efficient manner. It should be noted that the annuli need not be circular. They may, e.g., be quadratic, rectangular, ellipsoid, and oval or any other suitable shape. It is preferred that the annuli are circular since this allows for easy manufacturing and gives the enclosure a uniform flexibility.

The enclosure may further comprise an annular cover sealing portion adapted to form a seal with an annular sealing portion of a cover such that the enclosure and said cover form a closed, sealed compartment adapted to house said camera or camera head. This way the camera or camera head may be protected inside a compartment. The protection may be useful to protect the camera or camera head against dust, aerosols or other kinds of contaminants. The compartment may be of such a quality that a certain rating may be accomplished without the camera or camera head as such meeting the requirements of the rating.

The above object has also been achieved by an arrangement for recess mounting of a camera or camera head in a recess of a surface, the arrangement comprising; a cover, and an enclosure according to any variant disclosed above.

It may be noted that the enclosure may be used to protect the camera without being associated with a cover adapted to form a closed compartment. The enclosure as such may, e.g., be used to protect a camera from the dusty environment above a false ceiling with the camera being openly exposed to the comparably clean environment beneath the false ceiling. In such a case the annular cover sealing portion may be omitted. There may be a cover ring or the like, e.g., aiding in fixing the attachment portion to the recess. The cover ring or the like may be used to cover the edge of the recess. This is, e.g., useful if the recess is a through-hole cut in a tile formed of mineral fibre based material.

The cover may comprise a window and an annular sealing portion adapted to form a seal with an annular sealing portion of the enclosure, whereby the cover and the enclosure are adapted to form a closed, sealed compartment adapted to house said camera or camera head. As mentioned above, this way the camera or camera head may be protected inside a compartment. The protection may be useful to protect the camera or camera head against dust, aerosols or other kinds of contaminants. The compartment may be of such a quality that a certain rating may be accomplished without the camera or camera head as such meeting the requirements of the rating.

The arrangement may further comprise a camera support adapted to support said camera or camera head. If the cover is adapted for form a closed, sealed compartment with the enclosure, the camera or camera head is supported by the camera support inside the closed, sealed compartment.

The camera support may be movable such that a camera or camera head supported by the camera support is movable to provide a pan movement, a tilt movement and/or a rotation movement.

The arrangement may further comprise a camera, including optics, an image sensor and an image processor, supported by said camera support. This way the enclosure and cover may be used to accommodate the camera and thereby protect the complete camera.

The arrangement may further comprise a camera comprising a camera head including optics and an image sensor, a cable extending from the camera head to a main unit including an image processor, wherein the camera head is received in the sealed compartment, the cable extending through the cable sealing portion, and the main unit being located outside the sealed compartment. This way the enclosure and cover may be used to accommodate the camera head and thereby protect the camera head. This way it is possible to provide a compact solution by providing a minimum of components within the enclosure in the recess. In this embodiment the camera support does not support the complete camera but supports the camera head.

It may be noted that the image sensor may be a sensor using visible light, a sensor using IR (infrared) light, a microbolometer, a PIR sensor (passive infrared sensor), etc.

The window may be formed of a material allowing electromagnetic radiation within a wavelength interval detectable by an image sensor of the camera to pass from an outside into the camera such that the camera may provide a representation of the scene based on electromagnetic radiation within said wavelength interval. The wavelength interval which the window allows to pass into the camera is dependent upon which kind of sensor the camera is equipped with. It may be noted that the window may allow electromagnetic radiation at wavelengths also outside said interval to pass into the camera. The window may be formed of a translucent or transparent material, such as a polymeric material or glass, allowing visible light to pass from an outside into the camera such that the camera may provide a representation of the scene.

The annular sealing portion may be formed of a non-transparent portion extending around the window.

It may be noted that when denoted flexible, the material or entity is considered able to be deformed and to withstand the desired deformation without breaking. It may be noted that when denoted flexible and elastic, the material or entity is not only flexible but will also have a tendency to return to its original shape after release of the force causing the deformation. The Shore A hardness is measured according to ASTM D2240.

It is preferred that the enclosure comprising the different portions is integrally formed of a flexible and elastic material, preferably formed of an elastomeric material having hardness between 20 and 60° Shore A.

BRIEF DESCRIPTION OF THE DRAWINGS

The invention will by way of example be described in more detail with reference to the appended schematic drawings, which shows a presently preferred embodiment of the invention.

DETAILED DESCRIPTION OF THE PREFERRED EMBODIMENTS

In the figures there is disclosed an arrangement comprising enclosure 1, an attachment ring 2 and a cover 3 with a dome shaped window 4. A cable 5 extends from a camera or camera head 6. The arrangement is adapted to be mounted in a recess 7. The recess 7 is disclosed as a through-going hole in a plate shaped member 10.

Figure 1:
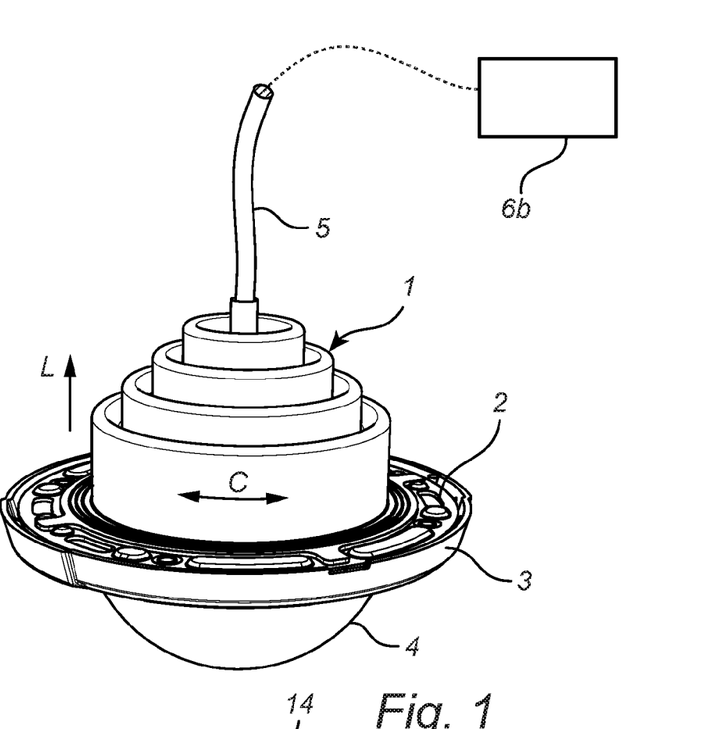
FIG. 1 discloses a perspective view of an arrangement for recess mounting of a camera.
Figure 2:
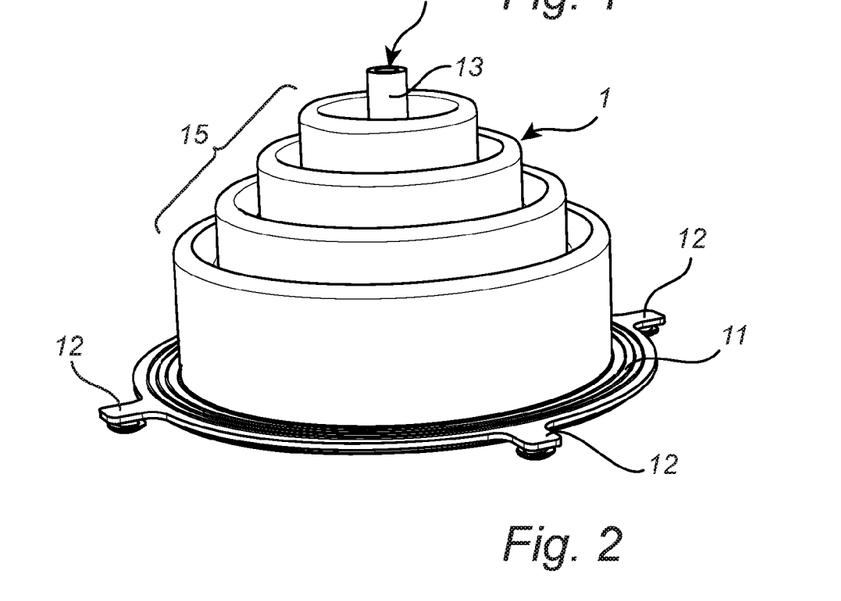
FIG. 2 discloses a perspective view of an enclosure adapted to form part of an arrangement for recess mounting of a camera.

As shown in FIG. 2, the enclosure 1 comprises an attachment portion 11, 12, a cable sealing portion 13, a circumferential wall portion 15 and an annular cover sealing portion 11. The enclosure 1 is integrally formed of an elastomeric material having hardness of about 30° Shore A. The enclosure 1 has a material thickness of about 1.2 mm.

The attachment portion comprises an annular portion 11 and a plurality of attachment segments or tabs 12. The attachment portion 11, 12 is adapted to be fixed relative to the recess 7. In the disclosed embodiment, the attachment ring 2 is adapted to be fixed relative to the recess 7 and the attachment portion 11, 12 is in turn adapted to be fixed relative to the attachment ring 2. The annular portion 11 also functions as an annular sealing portion 11 which will be disclosed in more detail below.

The cable sealing portion 13 has an opening 14 allowing a cable 5 to extend through the opening 14 and out of the enclosure 1. The cable sealing portion 13 is adapted to seal against an outer surface of the cable 5 extending through the cable sealing portion 13. As shown in the figures, the cable sealing portion 13 comprises a pipe shaped portion through which the cable is adapted to extend and which terminates in the opening 14. In a released state, the pipe shaped portion has an inner circumference $C_i$ being smaller than a circumference $C_o$ of the cable 5.

The circumferential wall portion 15 extends along a closed path and forms a closed wall in a circumferential direction C and in a first direction L extending from the attachment portion 11, 12 towards the cable sealing portion 13. When the enclosure 1 is mounted in the recess 7, this first direction L will be directed into the recess 7.

The circumferential wall portion 15 comprises a bellows portion shaped as a bellows tapered along the first direction L extending from the attachment portion 11, 12 towards the cable sealing portion 13. The bellows portion comprises a plurality of annular undulations each comprising a first major portion 15a-d extending in the first direction L and a second major portion 15a'-d' extending in a second direction opposite the first direction L. As is shown in the figures, the undulations are non-overlapping such that the bellows portion may be collapsed in the second direction for space-efficient transport and for providing great flexibility.

Figure 3A:
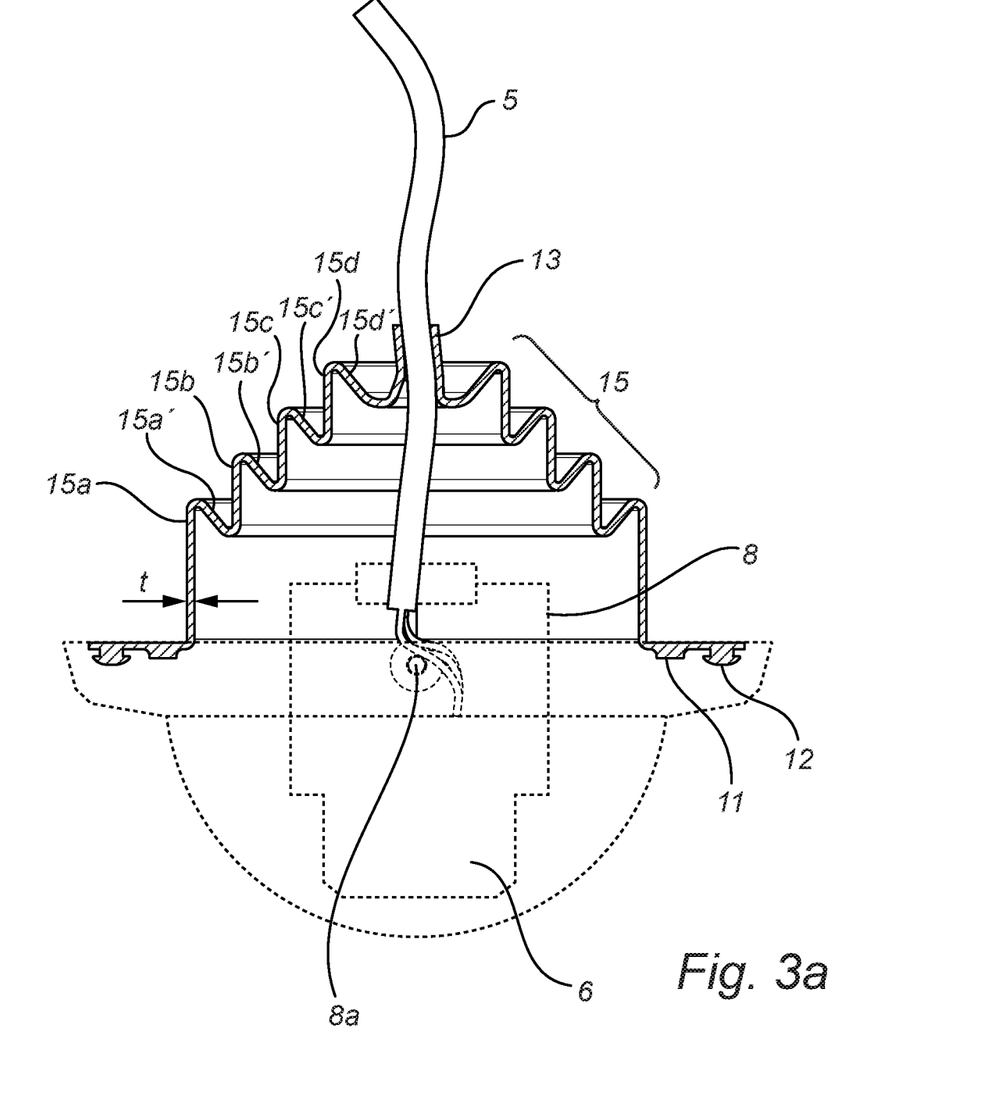
FIG. 3a and FIG. 3b discloses schematically the enclosure in two different positions of the camera.
Figure 3B:
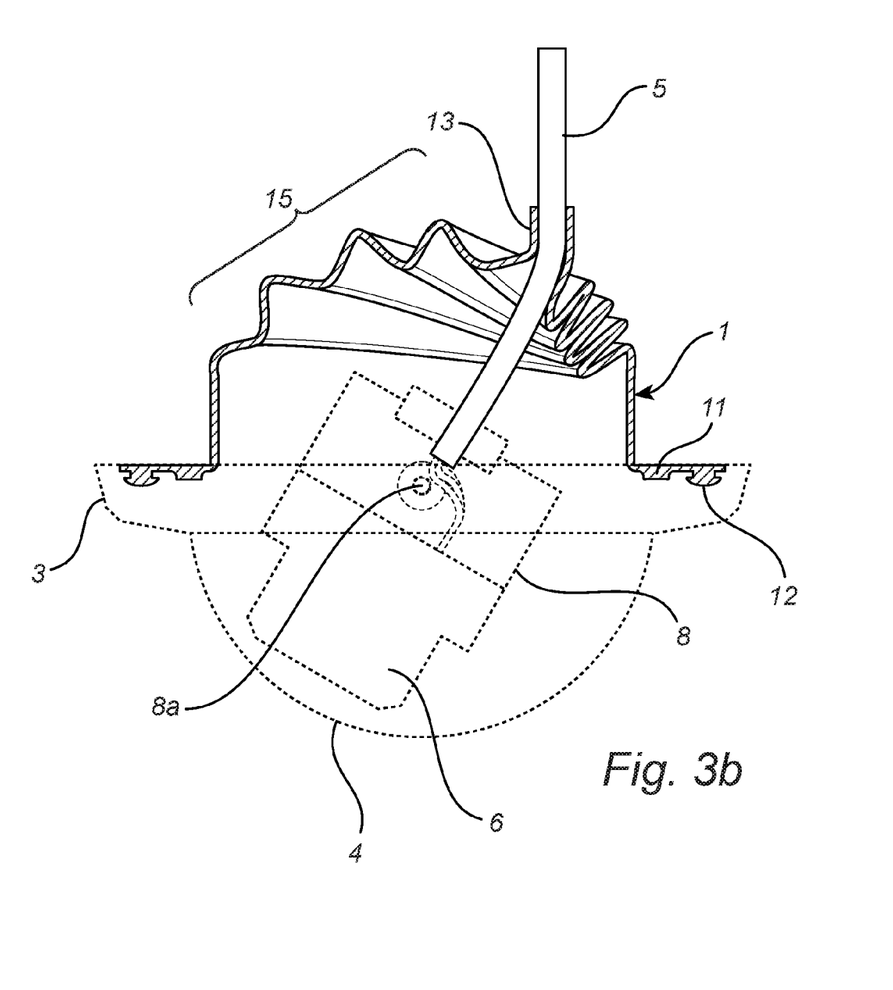

The cable sealing portion 13 is movable relative to the attachment portion 11, 12 in the first direction L and along a plane P1 parallel to a plane P2 defined by a mouth of the recess 7. As is shown in FIG. 3b, the cable sealing portion 13 is also movable in that it may be tilted in relation to the plane P1 parallel to the plane P2 defined by the recess 7.

Figure 4:
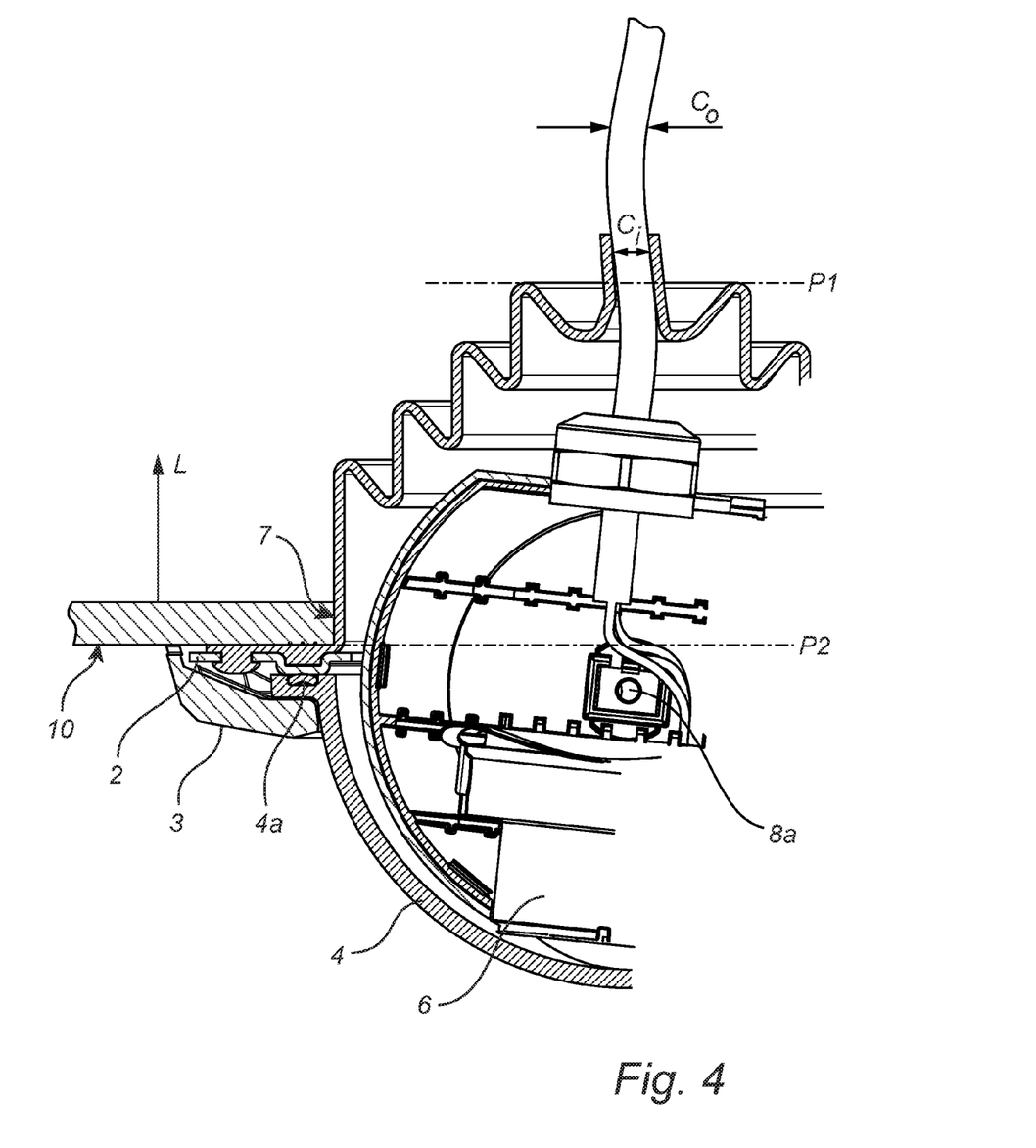
FIG. 4 is a cross-section of a recess mounted camera.

The annular cover sealing portion 11 is adapted to form a seal with an annular sealing portion 4a of a cover 3, 4 such that the enclosure 1 and the cover 3, 4 form a closed, sealed compartment in which the camera or camera head 6 is housed.

The cover 3 comprises a dome shaped window 4 and an annular sealing portion 4a adapted to form a seal with the annular sealing portion 11 of the enclosure 1.

The arrangement further comprises a camera support 8 located inside the compartment formed by the enclosure 1 and the cover 3, 4 and adapted to support the camera or camera head 6. The camera support 8 is movable or articulated such that the camera or camera head 6 supported by the camera support 8 is movable to provide a pan movement, a tilt movement and/or a rotation movement. This is schematically indicated by a pivot axis 8a.

In one embodiment a camera, including optics, an image sensor and an image processor, is supported by the camera support. In another embodiment a camera head 6 including optics and an image sensor is supported by the camera support 8 and a cable 5 extends from the camera head 6 to a main unit 6b including an image processor. In this latter embodiment, the camera head 6 is received in the sealed compartment, the cable 5 extends through the cable sealing portion 13, and the main unit 6b is located outside the sealed compartment.

The image sensor may be a sensor using visible light, a sensor using IR (infrared) light, a microbolometer, a PIR sensor (passive infrared sensor), etc.

The window 4 is formed of a material allowing electromagnetic radiation within a wavelength interval detectable by an image sensor of the camera to pass from an outside into the camera such that the camera may provide a representation of the scene based on electromagnetic radiation within said wavelength interval. The wavelength interval which the window allows to pass into the camera is dependent upon which kind of sensor the camera is equipped with. It may be noted that the window may allow electromagnetic radiation at wavelengths also outside said interval to pass into the camera. In one preferred embodiment, the window 4 is formed of a translucent or transparent material, such as a polymeric material or glass, allowing visible light to pass from an outside into the camera or camera head 6 such that the camera may provide a representation of the scene.

The ring shaped part 3 of the cover is formed of a non-transparent material thereby forming an opaque ring around the window. This ring shaped part 3 may add to the sealing properties of the arrangement or may have only an aesthetic purpose.

It is contemplated that there are numerous modifications of the embodiments described herein, which are still within the scope of the invention as defined by the appended claims.

The attachment portion 12 may for instance be formed as an annular ring (circular or non-circular) similarly to the design of the cover sealing portion 11. Alternatively, there may be only a single annular portion (circular or non-circular) acting both as attachment portion 12 and cover sealing portion 11. The overlap between the attachment portion 12 and the cover sealing portion 12 may be complete or only partial. The cover sealing portion 11 may alternatively be in sealing engagement with the ring shaped part 3 of the cover and a separate sealing may be provided between the ring shaped part 3 of the cover and the part 4 provided with the window.

The sealing portion 13 may be provided with a strain relief.

In the drawings, the enclosure is shown as being bellows-shaped. However, it may instead be of a smooth cone shape.

The circumferential wall of the enclosure may be formed entirely from one material, or two or more materials may be combined. For instance the first and second major portions may be formed as relatively rigid annuli interconnected by a softer material.

In the embodiment shown, the enclosure has just one cable sealing portion. However, it may be formed with two or more cable sealing portions allowing passage of more cables.

A light source, such as an IR light, may be provided in connection with the camera or camera head for illuminating a monitored scene.

What is claimed is:

1. An enclosure for recess mounting of a camera or camera head in a recess of a surface, the enclosure comprising:
    an attachment portion, which when in use is fixed relative to said recess;
    a cable sealing portion having an opening allowing a cable attached to said camera or camera head to extend through the opening and out of the enclosure, the cable sealing portion seals against an outer surface of the cable extending through the cable sealing portion; and
    a circumferential wall portion that extends along a closed path in a circumferential direction and in a first direction extending from the attachment portion towards the cable sealing portion, which first direction in use of the enclosure extends into the recess,
    wherein the enclosure in use provides a cavity inside which a camera or camera head located in the recess is positioned, and
        wherein at least a portion of the circumferential wall portion is formed of a flexible and/or elastic material such that the cable sealing portion is movable relative the attachment portion.

2. An enclosure according to claim 1, wherein the cable sealing portion is formed of a material which is flexible and/or elastic.

3. An enclosure according to claim 1, wherein the cable sealing portion in a released state has an inner circumference being smaller than a circumference of the cable that extends out of the enclosure.

4. An enclosure according to claim 1, wherein the cable sealing portion is formed of an elastomeric material having hardness between 20 and 60° Shore A.

5. An enclosure according to claim 1, wherein the cable sealing portion is movable relative to the attachment portion in the first direction and along a plane parallel to a plane defined by a mouth of said recess.

6. An enclosure according to claim 1, wherein said at least a portion of the circumferential wall portion being formed of a flexible and elastic material comprises a bellows portion shaped as a bellows tapered along a first direction extending from the attachment portion towards the cable sealing portion.

7. An enclosure according to claim 6, wherein the bellows portion comprises a plurality of annular undulations each comprising a first major portion extending in said first direction and a second major portion extending in a second direction opposite said first direction, wherein the undulations are non-overlapping such that the bellows portion may be collapsed in said second direction.

8. An enclosure according to claim 1, further comprising an annular cover sealing portion that forms a seal with an annular sealing portion of a cover such that the enclosure and said cover form a closed, sealed compartment that houses said camera or camera head.

9. An arrangement for recess mounting of a camera or camera head in a recess of a surface, the arrangement comprising:
    a cover; and
    an enclosure comprising:
        an attachment portion, which when in use is fixed relative to said recess;
        a cable sealing portion having an opening allowing a cable attached to said camera or camera head to extend through the opening and out of the enclosure, the cable sealing portion seals against an outer surface of the cable extending through the cable sealing portion; and
        a circumferential wall portion that extends along a closed path in a circumferential direction and in a first direction extending from the attachment portion towards the cable sealing portion, which first direction in use of the enclosure is adapted to extend into the recess,
        wherein the enclosure in use provides a cavity inside which a camera or camera head located in the recess is positioned, and
    wherein at least a portion of the circumferential wall portion is formed of a flexible and/or elastic material such that the cable sealing portion is movable relative the attachment portion.

10. An arrangement according to claim 9, wherein the cover comprises a window and an annular sealing portion that forms a seal with an annular sealing portion of the enclosure, whereby the cover and the enclosure form a closed, sealed compartment that houses said camera or camera head.

11. An arrangement according to claim 9, further comprising a camera support that supports said camera or camera head.

12. An arrangement according to claim 11, wherein the camera support is movable such that a camera or camera head supported by the camera support is movable to provide a pan movement, a tilt movement and/or a rotation movement.

13. An arrangement according to claim 9, further comprising a camera, including optics, an image sensor and an image processor, supported by said camera support.

14. An arrangement according to claim 9, further comprising a camera comprising a camera head including optics and an image sensor, a cable extending from the camera head to a main unit including an image processor, wherein the camera head is received in the sealed compartment, the cable extending through the cable sealing portion, and the main unit being located outside the sealed compartment.

15. An arrangement according to claim 9, wherein the window is formed of a material allowing electromagnetic radiation within a wavelength interval detectable by an image sensor of the camera to pass from an outside into the camera such that the camera may provide a representation of the scene based on electromagnetic radiation within said wavelength interval.

* * * * *